United States Patent
Terasawa

(10) Patent No.: US 9,322,468 B2
(45) Date of Patent: Apr. 26, 2016

(54) REDUCTION GEAR UNIT

(75) Inventor: Hideo Terasawa, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 279 days.

(21) Appl. No.: 14/127,743

(22) PCT Filed: Jun. 24, 2011

(86) PCT No.: PCT/JP2011/064556
§ 371 (c)(1),
(2), (4) Date: Dec. 19, 2013

(87) PCT Pub. No.: WO2012/176333
PCT Pub. Date: Dec. 27, 2012

(65) Prior Publication Data
US 2014/0109708 A1    Apr. 24, 2014

(51) Int. Cl.
*F16H 57/04*    (2010.01)
*F16C 33/66*    (2006.01)
(Continued)

(52) U.S. Cl.
CPC ............ *F16H 57/0493* (2013.01); *F16C 33/66* (2013.01); *F16C 33/6666* (2013.01); *F16H 57/0423* (2013.01); *F16H 57/0427* (2013.01);
(Continued)

(58) Field of Classification Search
CPC ..................... Y10T 74/19642; F16H 57/0493; F16C 33/6666; F16C 19/364; F16C 19/547
See application file for complete search history.

(56) References Cited

U.S. PATENT DOCUMENTS 2,631,904 A * 3/1953 Frenkel ................. F16C 19/364
384/450
3,951,483 A * 4/1976 Nakamura ............ F16C 19/364
384/565
(Continued)

FOREIGN PATENT DOCUMENTS

JP    59-141293    9/1984
JP    60-32547 A    2/1985
(Continued)

OTHER PUBLICATIONS

International Search Report (PCT/ISA/210) mailed on Jul. 26, 2011, by the Japanese Patent Office as the International Searching Authority for International Application No. PCT/JP2011/064556.
(Continued)

*Primary Examiner* — David M Fenstermacher
(74) *Attorney, Agent, or Firm* — Buchanan Ingersoll & Rooney PC

(57) ABSTRACT

A ring that includes an inner peripheral surfaces that surrounds an outer peripheral surface of a pinion shaft provided through a pinion, a gear-side end surface, a bearing-side end surface, and an outer peripheral surface inclined from the gear-side end surface toward an outer peripheral edge of the bearing-side end surface is provided between the pinion and an inner race. When the length from an outer peripheral edge of the outer peripheral edge of the gear-side end surface to an axial line of the pinion shaft is L10, the length from a tooth root of a large gear to the axial line is L11, the length from an outer peripheral edge of a gear-side end surface of a large-diameter-side flange portion to the axial line is L2, and the length from the outer peripheral edge of the bearing-side end surface to the axial line is L3, L10<L11 and L3≥L2.

11 Claims, 9 Drawing Sheets

(51) Int. Cl.
*F16C 19/36* (2006.01)
*F16C 19/54* (2006.01)

(52) U.S. Cl.
CPC ........ *F16H 57/0471* (2013.01); *F16H 57/0495* (2013.01); *F16C 19/364* (2013.01); *F16C 19/547* (2013.01); *F16C 2202/28* (2013.01); *F16C 2240/40* (2013.01); *F16C 2361/61* (2013.01); *Y10T 74/19642* (2015.01)

(56) References Cited

U.S. PATENT DOCUMENTS

| | | | | |
|---|---|---|---|---|
| 4,919,551 A * | 4/1990 | Nunotani | ............... | F16C 19/364 277/361 |
| 5,007,747 A * | 4/1991 | Takeuchi | ............... | F16C 19/225 384/450 |
| 5,711,738 A | 1/1998 | Abe et al. | | |
| 5,957,058 A | 9/1999 | Dampmann et al. | | |
| 6,502,996 B2 * | 1/2003 | Joki | ............... | F16C 19/364 384/450 |
| 7,175,351 B2 * | 2/2007 | Ono | ............... | F16C 19/364 384/470 |
| 7,210,852 B2 * | 5/2007 | Leimann | ............... | F16C 19/364 384/571 |
| 7,472,619 B2 * | 1/2009 | Leimann | ............... | F16C 19/54 384/571 |
| 7,645,074 B2 * | 1/2010 | Chiba | ............... | F16C 19/364 384/571 |
| 7,934,873 B2 * | 5/2011 | Harada | ............... | F16C 19/364 384/450 |
| 8,376,623 B2 * | 2/2013 | Shibagaki | ............... | F16C 19/54 384/462 |
| 8,480,308 B2 * | 7/2013 | Masuda | ............... | F16C 19/225 384/564 |
| 9,074,678 B1 * | 7/2015 | Marsh, Jr. | ............... | F16C 19/54 |
| 2003/0185477 A1 | 10/2003 | Taki et al. | | |

FOREIGN PATENT DOCUMENTS

| | | |
|---|---|---|
| JP | 61-172252 U | 10/1986 |
| JP | 62-142895 A | 6/1987 |
| JP | 62-191952 U | 12/1987 |
| JP | 63-140895 A | 6/1988 |
| JP | 3-239852 A | 10/1991 |
| JP | 3-276698 A | 12/1991 |
| JP | 5-94563 U | 12/1993 |
| JP | 6-74551 U | 10/1994 |
| JP | 8-28667 A | 2/1996 |
| JP | 8-286667 A | 11/1996 |
| JP | 11-500383 A | 1/1999 |
| JP | 11-48806 A | 2/1999 |
| JP | 2001-12461 A | 1/2001 |
| JP | 2001-159460 | 6/2001 |
| JP | 2003-278771 A | 10/2003 |
| JP | 2003-294044 A | 10/2003 |
| JP | 2006-214505 A | 8/2006 |
| JP | 2007-315566 | 12/2007 |
| JP | 2007-315568 A | 12/2007 |

OTHER PUBLICATIONS

Written Opinion (PCT/ISA/237) mailed on Jul. 26, 2011, by the Japanese Patent Office as the International Searching Authority for International Application No. PCT/JP2011/064556.

* cited by examiner

14 INTERMESHING PITCH LINE

REDUCTION GEAR UNIT

FIELD

The present invention relates to a reduction gear unit mainly used for driving a railway vehicle (hereinafter, simply "gear unit").

BACKGROUND

A conventional gear unit is configured by including a high-speed-side pinion that is fixed to a pinion shaft provided parallel to an axle; a low-speed-side large gear that is fixed to the axle, formed with a diameter larger than a diameter of the pinion, and meshes with the pinion; and a gear case that accommodates therein the pinion and the large gear. This gear unit with the axle is installed on a truck frame, and transmits a rotational torque from a traction motor to the axle to rotate wheels mounted on the axle. The pinion and the large gear are held in the gear case by bearings located on each of both sides of these gears in order that their axial lines are parallel to each other, and mesh with each other. As the bearing of this gear unit, a tapered roller bearing capable of supporting a radial load and a thrust load, and having a large allowable load capacity is used. This bearing is accommodated in a bearing cap fitted to the gear case for ease of maintenance. At the bottom of the gear case, a necessary amount of lubricant oil is stored. The height of the lubricant oil level is managed in order that a part of the large gear is dipped in the lubricant oil.

The lubricant oil stored at the bottom of the gear case, is drawn up by rotations of the large gear and is supplied to a meshing part between the large gear and the pinion (hereinafter, "meshing part"), to low-speed-side bearings provided on each of both sides of the large gear, to high-speed-side bearings provided on each of both sides of the pinion, and the like.

To be more specific, first in the meshing part, lubricant oil sticks to tooth flanks of the large gear and therefore this lubricant oil is directly supplied to the meshing part when the large gear rotates. Next, in the low-speed-side bearing, lubricant oil drawn up by the tooth flanks of the large gear and splashing within the gear case, is collected by an oil pan provided at the top of the gear case. The collected lubricant oil is supplied into the bearing from a small-diameter-side end surface of a tapered roller (hereinafter, simply "roller") in the low-speed-side bearing. Next, the high-speed-side bearing is explained. Because the pinion rotates at high speed, it is necessary to directly supply lubricant oil particularly to an area where a large-diameter-side end surface of a roller of the high-speed-side bearing (a pinion-side surface of the roller) comes into contact with a large-diameter-side flange portion of an inner race of the high-speed-side bearing.

For example, in, a typical conventional gear unit in Patent Literature 1 mentioned below, a pinion and a larger gear are accommodated in a semi-hermetic gear case with these gears meshed with each other, as shown in FIG. 1 of the Patent Literature 1. The lubricant oil in the gear case is drawn up by rotations of the large gear. Further, in this conventional gear unit, an opening provided on the gear side between an inner race and an outer race of a high-speed-side bearing is arranged schematically on the lateral side of a meshing part. That is, the opening of the high-speed-side bearing extends in the width (thickness) direction of each gear and is located close to the pinion with respect to an intermeshing pitch line.

With such a configuration, the lubricant oil sticking between teeth formed on the large gear, is pushed out to both sides of the meshing part (in the width direction of each gear) by the meshing of the large gear and the pinion. The lubricant oil, having been pushed out, enters into the high-speed-side bearing from the opening of the bearing, and is supplied to a contact portion between the large-diameter-side end surface of the roller and the large-diameter-side flange portion of the inner race. As described above, in the typical gear unit according to the conventional technique in Patent Literature 1 mentioned below, the opening of the high-speed-side bearing is arranged schematically on the lateral side of the meshing part. Therefore, lubricant oil is continuously supplied to areas where lubricant oil is required, and overheating and seizure of the bearing are suppressed.

CITATION LIST

Patent Literature

Patent Literature 1: Japanese Utility Model Application No. 6-74551

SUMMARY

Technical Problem

However, the typical gear unit according to the conventional technique in Patent Literature 1 mentioned above has the following problems. As described above, according to the conventional technique, the opening of the high-speed-side bearing is arranged schematically on the lateral side of the meshing part. However, depending on the setting on the module of a gear and on the setting on the number of teeth of a pinion, the opening of the high-speed-side bearing cannot be arranged on the lateral side of the meshing part. For example, there is a case where the opening is provided on the large-gear side with respect to the intermeshing pitch line. In that case, lubricant oil pushed out from the meshing part, hits a gear-side end surface of the inner race of the high-speed-side bearing. As a result, a supply of the lubricant oil into the bearing becomes insufficient and overheating and seizure of the bearing can be caused.

An object of the present invention is to provide a gear unit and a bearing of the gear unit, which can stably supply lubricant oil to the interior of the bearing, regardless of the setting on a module of a gear and the setting on the number of teeth of a pinion.

Solution to Problem

There is provided a reduction gear unit according to an aspect of the present invention that accommodates, in a gear case, a pinion that transmits a rotational force, a large gear that meshes with the pinion and transmits a rotational force, and a bearing that is located on each of both sides of the pinion and is configured to include an inner race, an outer race, and a plurality of rollers, wherein each of the rollers is configured to have a shape tapered from a large-diameter-side end surface provided on a side of the pinion toward a small-diameter-side end surface provided on an opposite side to the side of the pinion, the inner race includes a small-diameter-side flange portion that is provided on a part of the small-diameter-side end surface of the roller, which is opposite to the pinion, and extends in a direction from the inner race to the outer race, and a large-diameter-side flange portion that extends in a direction from the inner race to the outer race while enclosing the large-diameter-side end surface of the roller, so as to be close to the outer race and forms an opening between the outer race and the large-diameter-side flange portion, an ring that has an annular shape, and that is configured to include an inner peripheral surface that surrounds an outer peripheral surface of a pinion shaft provided through the pinion, a gear-side end portion that is provided on the side of the pinion, a bearing-side end portion that is provided on a side of the bearing, and an outer peripheral surface that is inclined from the gear-side end portion toward an outer peripheral edge of the bearing-side end portion, is provided between the pinion and the inner race, and when a length from the gear-side end portion to an axial line of the pinion shaft is represented as L10, a length from a tooth root of the large gear to the axial line is represented as L11, a length from an outer peripheral edge of a gear-side end surface of the large-diameter-side flange portion to the axial line is represented as L2, and a length from an outer peripheral edge of the bearing-side end portion to the axial line is represented as L3, the outer peripheral surface has a shape satisfying a relationship expressed as L10<L11, and also satisfying a relationship expressed as L3≥L2.

Advantageous Effects of Invention

According to the present invention, between a pinion and an inner race, an ring is provided in which an outer peripheral surface inclined from an meshing part between a large gear and the pinion toward an opening of a bearing is formed. Therefore, lubricant oil can be stably supplied to the interior of the bearing.

DESCRIPTION OF EMBODIMENTS

Exemplary embodiments of a reduction gear unit according to the present invention will be explained below in detail with reference to the accompanying drawings. The present invention is not limited to the embodiments.

First Embodiment

Figure 1:
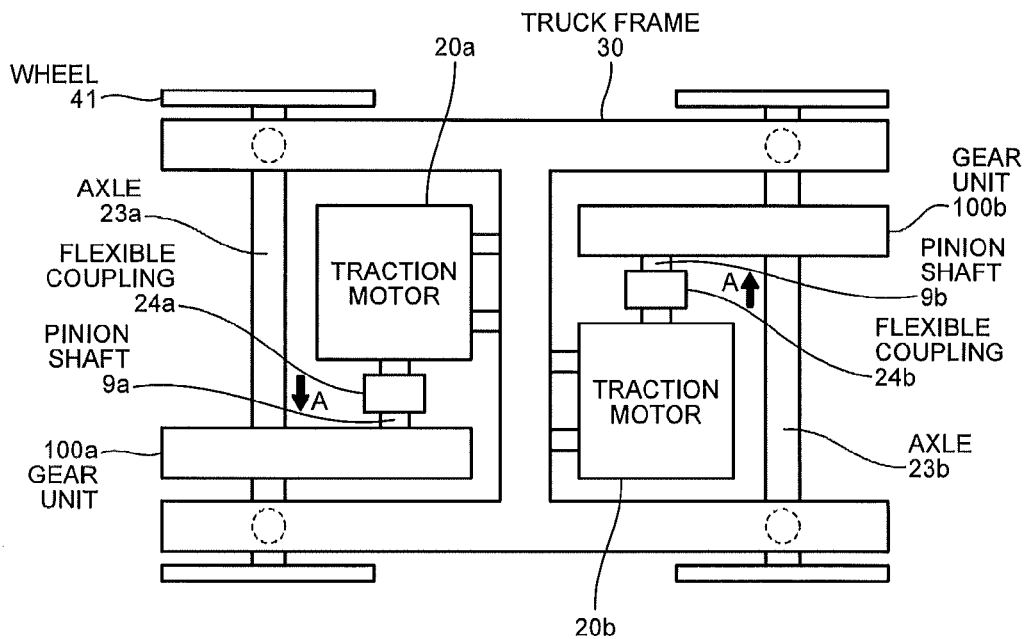
FIG. 1 is a schematic diagram of a truck for a vehicle in which gear units according to a first embodiment of the present invention are installed.
Figure 2:
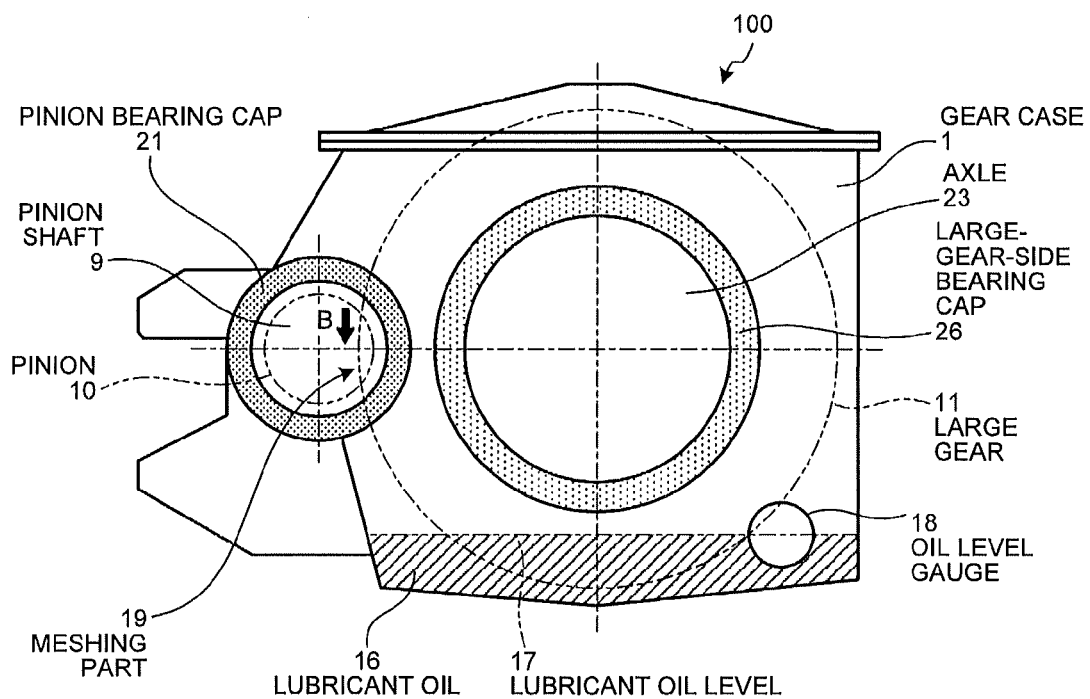
FIG. 2 is an external view of a gear unit as viewed from a direction indicated by an arrow A shown in FIG. 1.

FIG. 1 is a schematic diagram of a truck for a vehicle in which gear units 100a and 100b according to a first embodiment of the present invention are installed. FIG. 2 is an external view of a gear unit 100 as viewed from a direction indicated by an arrow A shown in FIG. 1.

In FIG. 1, the truck for a vehicle is configured to include traction motors 20a and 20b that are installed on a truck frame 30; axles 23a and 23b that are rotatably provided on the truck frame 30, and that have wheels 41 fitted to both ends of the axles 23a and 23b; and the gear units 100a and 100b that are respectively coupled with the traction motors 20a and 20b and with the axles 23a and 23b, and that respectively reduce the rotating speed of the traction motors 20a and 20b to transmit driving force to the axles 23a and 23b.

The axle 23a is mounted to the gear unit 100a, and the axle 23b is mounted to the gear unit 100b. A rotor shaft of the traction motor 20a and a pinion shaft 9a of the gear unit 100a are flexibly coupled by a flexible coupling 24a. A rotor shaft of the traction motor 20b and a pinion shaft 9b of the gear unit 100b are flexibly coupled by a flexible coupling 24b.

The gear unit 100a reduces the rotating speed of the traction motor 20a and transmits the reduced rotating speed to the axle 23a. A rotational torque of the traction motor 20a is transmitted to the gear unit 100a through the flexible coupling 24a to rotatably drive the axle 23a and the wheels 41. Similarly, the gear unit 100b reduces the rotating speed of the traction motor 20b and transmits the reduced rotating speed to the axle 23b. A rotational torque of the traction motor 20b is transmitted to the gear unit 100b through the flexible coupling 24b to rotatably drive the axle 23b and the wheels 41.

The gear unit 100 shown in FIG. 2 is configured to include a pinion 10 that is fixed to a pinion shaft 9 provided parallel to an axle 23; a large gear 11 that is fixed to the axle 23, formed with a diameter larger than a diameter of the pinion 10, and meshes with the pinion 10; and a gear case 1 that stores therein a necessary amount of lubricant oil 16, and accommodates therein the pinion 10 and the large gear 11.

On the left side of the gear case 1 (on the left side in FIG. 2), a pinion bearing cap 21 is fitted. On the right side of the gear case 1 (on the right side in FIG. 2), a large-gear-side bearing cap 26 is fitted. The pinion bearing cap 21 and the large-gear-side bearing cap 26 are located on an traction motor-side surface of the gear case 1, and surround and support respective bearing outer races. The height of a lubricant oil level 17 is managed by an oil level gauge 18 in order that a part of the large gear 11 is dipped in the lubricant oil 16.

Figure 3:
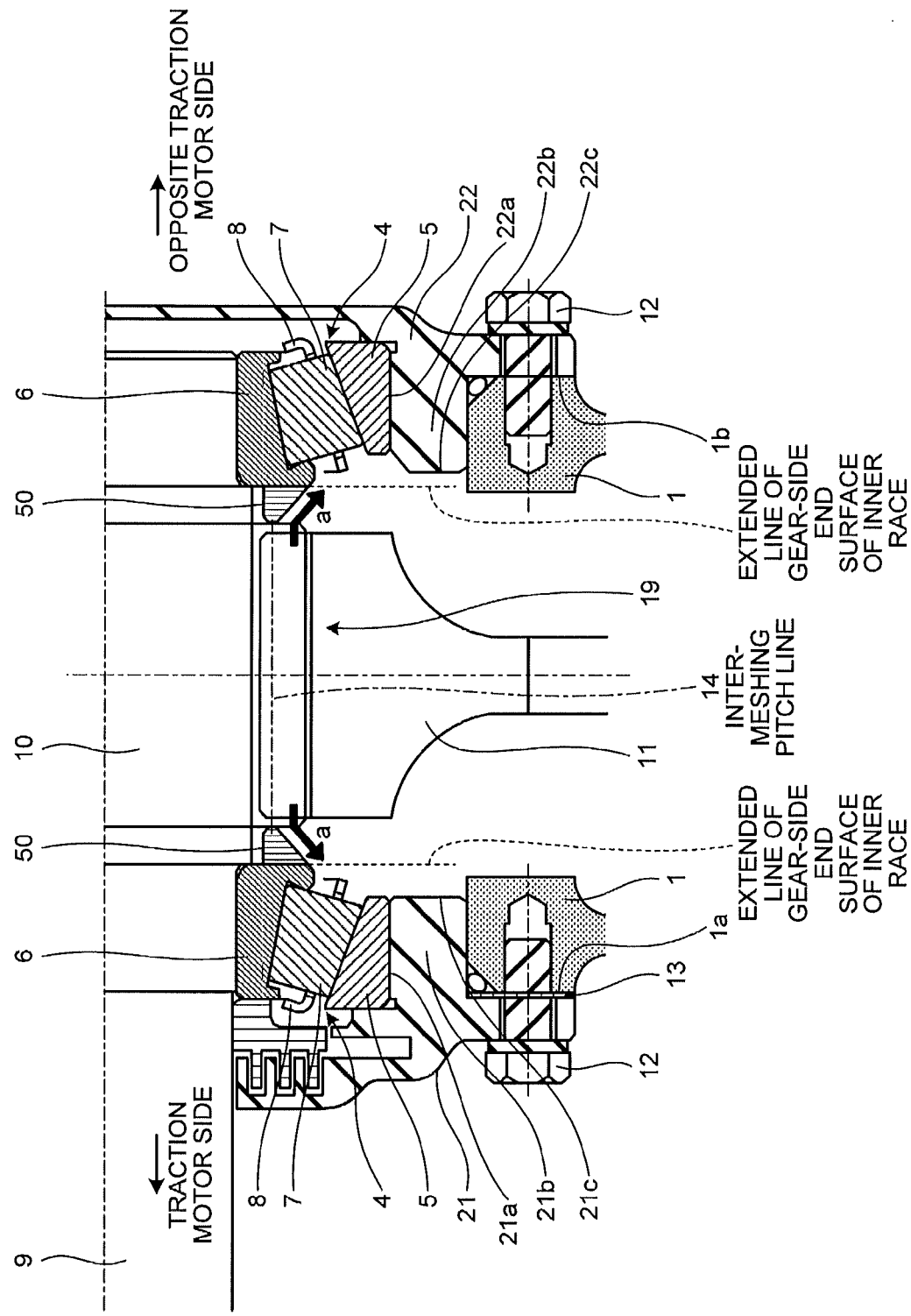
FIG. 3 is a cross-sectional view of the gear unit as viewed from a direction indicated by an arrow B shown in FIG. 2.
Figure 4:
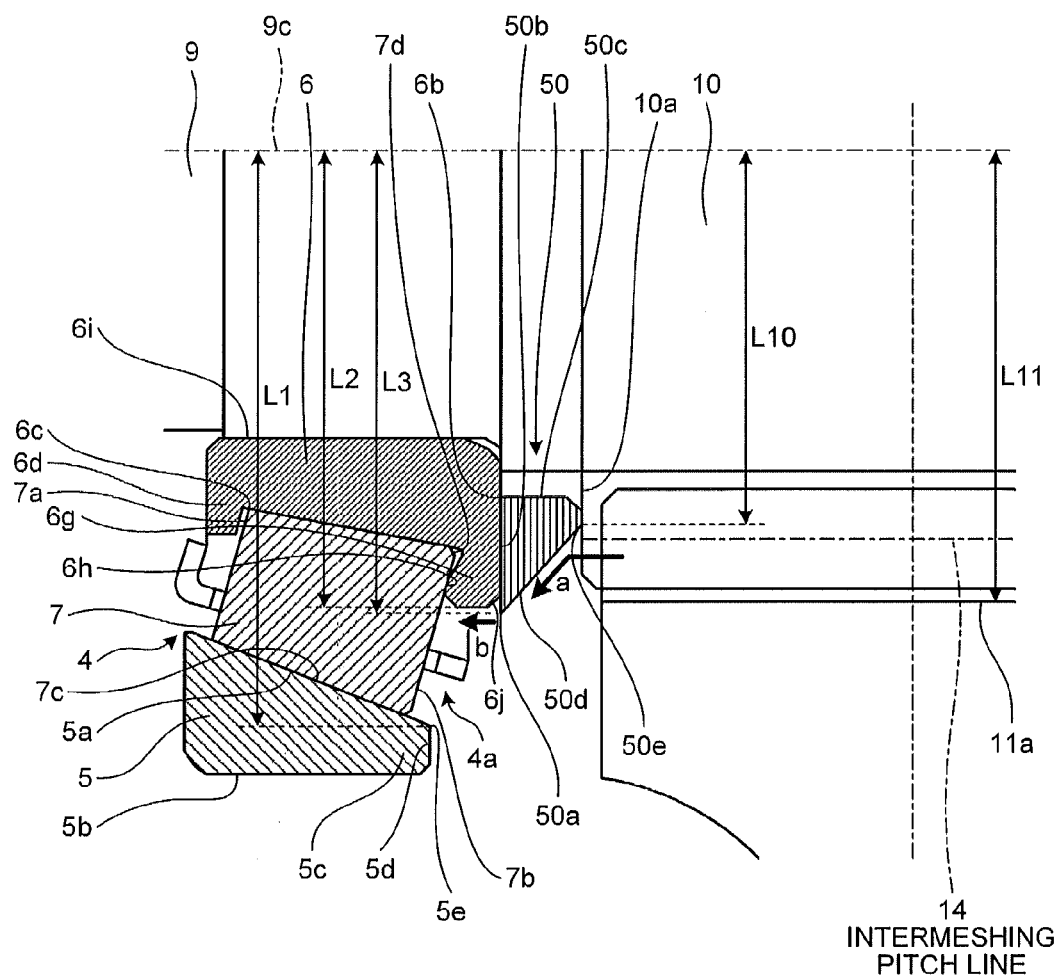
FIG. 4 depicts a detailed structure of an ring shown in FIG. 3.

FIG. 3 is a cross-sectional view of the gear unit as viewed from a direction indicated by an arrow B shown in FIG. 2. FIG. 3 depicts an internal configuration of the gear unit 100, which focuses on the pinion 10 that is fixed to the pinion shaft 9 and on a high-speed-side bearing (a bearing 4) located on each of both sides of the pinion 10. FIG. 4 depicts a detailed structure of an ring 50 shown in FIG. 3.

The bearing 4 is configured to include an inner race 6 that rotates integrally with the pinion shaft 9, an outer race 5 that is provided in the gear case 1, and a plurality of rollers 7 that are rotatably arranged between the inner race 6 and the outer race 5 while maintaining a predetermined spacing to one another in the rotation direction of the inner race 6 by a bearing cage 8. The bearing cage 8 prevents the rollers 7 from coming off the bearing 4, and also holds the rollers 7 at equal spacing in the bearing 4 to prevent the rollers 7 from coming into contact with each other.

On a surface 1a of the gear case 1 on the traction motor side shown in FIG. 3, the pinion bearing cap 21 that is detachably fixed by a fastener 12 (for example, a bolt) screwed into the surface 1a on the traction motor side is located, in consideration of the maintainability of the bearing 4. The pinion bearing cap 21 is configured to include an annular portion 21b that is interposed between the gear case 1 and an outer peripheral surface 5b of the outer race 5, and that surrounds the outer peripheral surface 5b. The annular portion 21b extends from outside of the gear case 1 toward the inside and parallel to the pinion shaft 9, while enclosing the outer peripheral surface 5b of the outer race 5. An inner peripheral portion 21a of the annular portion 21b comes into contact with the outer peripheral surface 5b of the outer race 5. An end surface 21c of the annular portion 21b on the inside of the gear case 1 is provided before an extended line of a gear-side end surface 6b of the inner race 6, as an example. The outer race 5 held by the pinion bearing cap 21 is capable of separating from the rollers 7 and the inner race 6 when the fastener 12 is removed. With this configuration, it is possible to perform maintenance of the bearing 4.

Between the pinion bearing cap 21 and the gear case 1, a shim set 13 that includes several shims and has an appropriate thickness is incorporated in order to provide an appropriate clearance to the parts of the bearing 4. By using the shim set 13, it is possible to continue rotations without causing seizure of the bearing 4 even when the respective portions of the bearing 4 expand due to a temperature rise during operation. The thickness of the shim set 13 is managed with a defined upper limit value of the clearance in order to prevent the pinion shaft 9 from being largely inclined. In the pinion bearing cap 21, a labyrinth seal is provided at a boundary portion between the pinion bearing cap 21 and the pinion shaft 9 in order to prevent a part of the lubricant oil 16 in the gear case 1 from leaking outside the gear case 1, and also to prevent outside dust and the like from entering into the gear case 1.

On a surface 1b of the gear case 1 shown in FIG. 3, which is opposite to the traction motor side, a pinion bearing cap 22 that is detachably fixed by the fastener 12 (for example, a bolt) screwed into the surface 1b opposite to the traction motor side is located, in consideration of the maintainability of the bearing 4. The pinion bearing cap 22 is configured to include an annular portion 22b that is interposed between the gear case 1 and the outer peripheral surface 5b of the outer race 5, and that surrounds the outer peripheral surface 5b. The annular portion 22b extends from outside of the gear case 1 toward the inside and parallel to the pinion shaft 9, while enclosing the outer peripheral surface 5b of the outer race 5. An inner peripheral portion 22a of the annular portion 22b comes into contact with the outer peripheral surface 5b of the outer race 5. An end surface 22c of the annular portion 22b on the inside of the gear case 1 is provided before the extended line of the gear-side end surface 6b of the inner race 6, as an example. The outer race 5 held by the pinion bearing cap 22 is capable of separating from the rollers 7 and the inner race 6 when the fastener 12 is removed. With this configuration, it is possible to perform maintenance of the bearing 4.

In FIG. 4, the roller 7 includes a large-diameter-side end surface 7b that is provided on the side of the pinion 10 in the bearing 4, and a small-diameter-side end surface 7a that is provided on the opposite side to the side of the pinion 10 in the bearing 4. The roller 7 is configured to have a shape tapered from the large-diameter-side end surface 7b toward the small-diameter-side end surface 7a.

The outer race 5 is configured to include a conical raceway surface 5a that is provided on the inner peripheral side, and that comes into contact with an outer peripheral surface 7c of the roller 7.

The inner race 6 is configured to include an inner peripheral surface 6i that surrounds an outer peripheral surface of the pinion shaft 9, a conical raceway surface 6c that is provided on the outer peripheral side, and that comes into contact with the outer peripheral surface 7c of the roller 7, a small-diameter-side flange portion 6d, a large-diameter-side end surface 6h, and a large-diameter-side flange portion 6g.

The small-diameter-side flange portion 6d is provided on the opposite side to the side of the pinion 10 in the bearing 4 with respect to an extended line of the small-diameter-side end surface 7a of the roller 7.

The large-diameter-side flange portion 6g is provided on the side of the pinion 10 in the bearing 4 with respect to an extended line of the large-diameter-side end surface 7b of the roller 7. The large-diameter-side flange portion 6g extends in the direction from the inner race 6 to the outer race 5, while enclosing the large-diameter-side end surface 7b of the roller 7, to be close to a gear-side end surface 5d of the outer race 5, thereby forming an opening 4a between the gear-side end surface 5d and the large-diameter-side flange portion 6g.

The large-diameter-side end surface 6h that comes into contact with the large-diameter-side end surface 7b of the roller 7 and guides the roller 7, is provided on the side of the roller 7 in the large-diameter-side flange portion 6g of the inner race 6. The large-diameter-side end surface 6h of the inner race 6 comes into contact with the large-diameter-side end surface 7b of the roller 7, thereby restricting movement of the roller 7 in the roller-shaft direction.

Between the pinion 10 and the inner race 6, the ring 50 having an annular shape is provided. The ring 50 includes an inner peripheral surface 50c that surrounds an outer peripheral surface of the pinion shaft 9; a gear-side end surface 50e that is provided on the side of the pinion 10; a bearing-side end surface 50b that is provided on the side of the bearing 4; and an outer peripheral surface 50d that is provided between the gear-side end surface 50e and an outer peripheral edge 50a of the bearing-side end surface 50b, and that is inclined from an meshing part 19 between the large gear 11 and the pinion 10 toward the opening 4a of the bearing 4. That is, the outer peripheral surface 50d of the ring 50 is inclined so as to be away from an axial line 9c of the pinion shaft 9, as the outer peripheral surface 50d extends from a bearing-side end surface 10a of the pinion 10 toward the opening 4a of the bearing 4.

When the length from an outer peripheral edge of the gear-side end surface 50e to the axial line 9c of the pinion shaft 9 is represented as L10, the length from a tooth root 11a of the large gear 11 to the axial line 9c is represented as L11, the length from an outer peripheral edge 6j of the gear-side end surface 6b of the large-diameter-side flange portion 6g to the axial line 9c is represented as L2, and the length from the outer peripheral edge 50a of the bearing-side end surface 50b to the axial line 9c is represented as L3, the outer peripheral surface 50d of the ring 50 has a shape satisfying the relationship expressed as $L10<L11$, and also satisfying the relationship expressed as $L3 \geq L2$.

Further, when the length from an inner peripheral edge 5e of the gear-side end surface 5d of the outer race 5 to the axial line 9c of the pinion shaft 9 is represented as L1, then the ring 50 shown in FIG. 4 is configured so that the relationship expressed as $L1>L3 \geq L2 \geq L11>L10$ holds. While FIG. 4 depicts a case where L3 is larger than L2 (L3>L2) as an example, L3 can also be the same value as L2 (L3=L2). Furthermore, in a case where the outer peripheral edge 6j of the inner race 6 is chamfered as shown in FIG. 4, when the length from the intersecting part of the chamfered portion and the gear-side end surface 6b (the part of the straight portion of the gear-side end surface 6b immediately before the curve of the outer peripheral edge 6j) to the axial line 9c is regarded as L2, the ring 50 can also be configured so that the relationship expressed as $L3 \geq L2$ holds.

Next, movement of the lubricant oil 16 is explained. The lubricant oil 16 stored at the bottom of the gear case 1, is drawn up by rotations of the large gear 11 and is supplied to the meshing part 19 between the large gear 11 and the pinion 10, to a low-speed-side bearing (not shown) provided on each of both sides of the large gear 11, to the bearing 4 provided on each of both sides of the pinion 10, and the like. For example, lubricant oil 16, sticking to tooth flanks of the large gear 11, is supplied directly to the meshing part 19. Next, concerning the low-speed-side bearing, the lubricant oil 16 drawn up by the tooth flanks of the large gear 11 and splashing within the gear case 1, is collected by an oil pan (not shown) provided on the top of the gear case 1. The collected lubricant oil 16 is supplied from a small-diameter-side end surface of a roller 7 within the low-speed-side bearing into the bearing.

Next, an oil supply to the bearing 4 is explained by using the symbols a and b shown in FIGS. 3 and 4. (a) The lubricant oil 16 sticking between teeth of the large gear 11, is pushed out to both sides of the pinion 10 due to the meshing of the large gear 11 and the pinion 10. The lubricant oil 16 pushed out from the meshing part 19, moves to the side of the opening 4a in the bearing 4 along the outer peripheral surface 50d of the ring 50 fitted between the inner race 6 and the pinion 10. (b) The lubricant oil 16 having moved along the outer peripheral surface 50d of the ring 50, is supplied from the opening 4a to the interior of the bearing 4, and is supplied to a contact portion between the large-diameter-side end surface 6h of the inner race 6 and the large-diameter-side end surface 7b of the roller 7, and to a contact portion between the raceway surface 6c of the inner race 6 and the outer peripheral surface 7c of the roller 7.

Next, an example in which the shape of the ring 50 is changed is explained.

Figure 5:
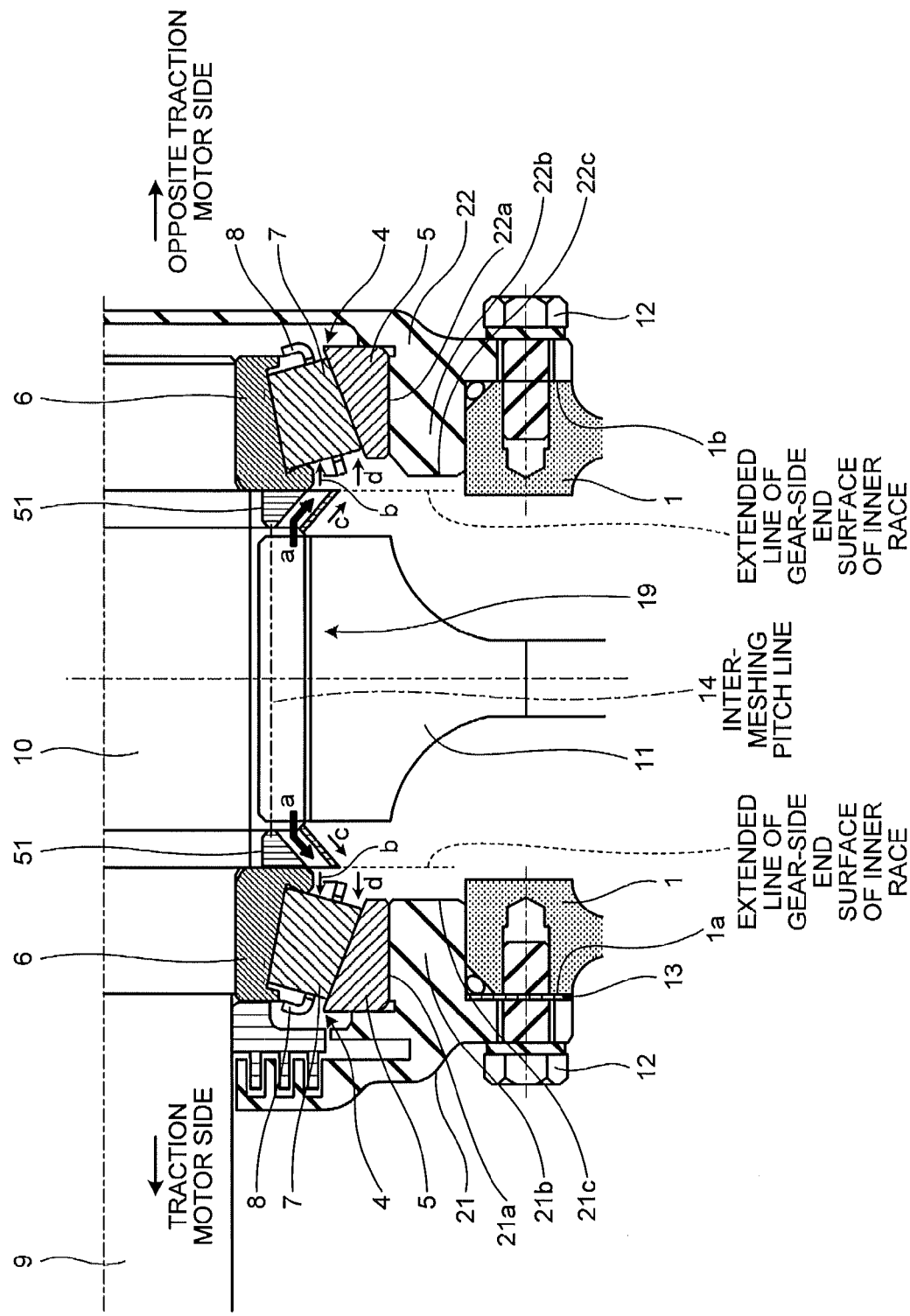
FIG. 5 is another cross-sectional view of the gear unit as viewed from the direction indicated by the arrow B shown in FIG. 2.
Figure 6:
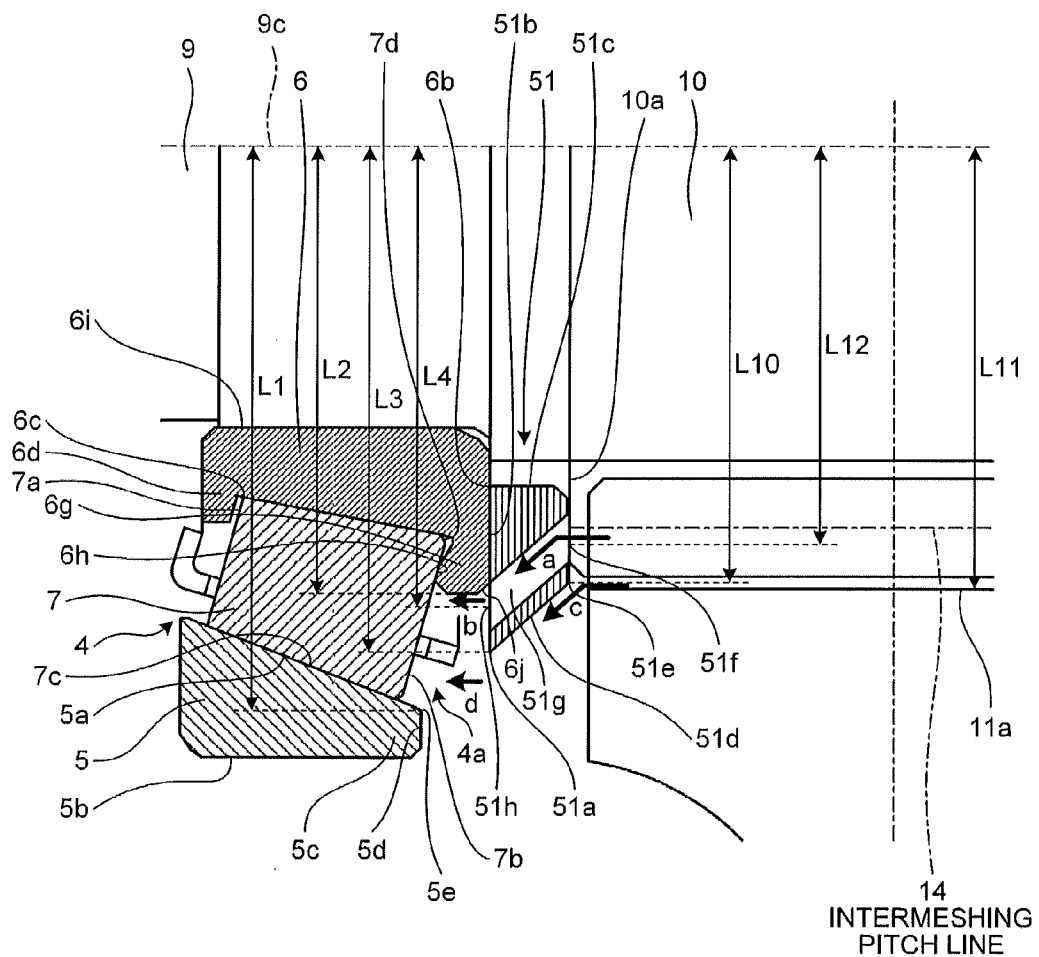
FIG. 6 depicts a detailed structure of an ring shown in FIG. 5.

FIG. 5 is another cross-sectional view of the gear unit as viewed from the direction indicated by the arrow B shown in FIG. 2. FIG. 6 depicts a detailed structure of an ring 51 shown in FIG. 5. In the following descriptions, elements that are identical or similar to those shown in FIG. 3 and FIG. 4 are denoted by like reference signs and explanations thereof will be omitted, and elements different from these drawings are explained.

Between the pinion 10 and the inner race 6, a ring 51 having an annular shape is provided. The ring 51 includes an inner peripheral surface 51c that surrounds the outer peripheral surface of the pinion shaft 9, a gear-side end surface 51e that is provided on the side of the pinion 10, a bearing-side end surface 51b that is provided on the side of the bearing 4, and an outer peripheral surface 51d that is provided between the gear-side end surface 51e and an outer peripheral edge 51a of the bearing-side end surface 51b, and that is inclined from the meshing part 19 between the large gear 11 and the pinion 10 toward the opening 4a of the bearing 4.

When the length from an outer peripheral edge of the gear-side end surface 51e to the axial line 9c of the pinion shaft 9 is represented as L10, the length from the tooth root 11a of the large gear 11 to the axial line 9c is represented as L11, the length from the outer peripheral edge 6j of the gear-side end surface 6b of the large-diameter-side flange portion 6g to the axial line 9c is represented as L2, and the length from the outer peripheral edge 51a of the bearing-side end surface 51b to the axial line 9c is represented as L3, then the outer peripheral surface 51d of the ring 51 has a shape satisfying the relationship expressed as L10<L11, and also satisfying the relationship expressed as L3≥L2.

Further, when the length from the inner peripheral edge 5e of the gear-side end surface 5d of the outer race 5 to the axial line 9c of the pinion shaft 9 is represented as L1, then the ring 51 shown in FIG. 6 is configured so that the relationship expressed as L1>L3≥L2≥L11>L10 holds.

Differences between the ring 51 and the ring 50 shown in FIG. 4 are as follows. A plurality of through holes 51g that are formed with a predetermined spacing there between in the rotation direction of the ring 51, and that connect from the bearing-side end surface 10a of the pinion 10 toward the opening 4a of the bearing 4 are provided in the ring 51. The lubricant oil 16 pushed out from the meshing part 19 between the pinion 10 and the large gear 11, flows into a gear side opening 51f of the through hole 51g. The lubricant oil 16 having flown into the through hole 51g, is drained from a bearing side opening 51h provided on the side of the outer race 5 with respect to the outer peripheral edge 6j of the gear-side end surface 6b of the inner race 6.

When the length from the gear side opening 51f of the through hole 51g to the axial line 9c of the pinion shaft 9 is represented as L12, and the length from the bearing side opening 51h of the through hole 51g to the axial line 9c of the pinion shaft 9 is represented as L4, then the through hole 51g shown in FIG. 6 is configured to have a shape satisfying the relationship expressed as L12<L4. That is, the through hole 51g shown in FIG. 6 is inclined so as to be away from the axial line 9c of the pinion shaft 9, as the through hole 51g extends from the bearing-side end surface 10a of the pinion 10 toward the opening 4a of the bearing 4.

Therefore, the lubricant oil 16 pushed out from the meshing part 19, is forcibly supplied to the opening 4a of the bearing 4 through the through hole 51g by a centrifugal force generated when the ring 51 rotates. Further, a part of the lubricant oil 16 pushed out from the meshing part 19, is supplied to the opening 4a of the bearing 4 along the outer peripheral surface 51d.

While the ring 51 shown in FIG. 6 is configured so that L1>L3≥L2≥L11>L10 holds, the configuration is not limited thereto. For example, the ring 51 can also be configured so that a value of L3 is equal to a value of L1. That is, it suffices that the ring 51 has a shape satisfying the relationship expressed as L1≥L3≥L2≥L11>L10. Even when L3=L1, because the bearing side opening 51h of the through hole 51g is located in the opening 4a of the bearing 4, it is still possible to supply the lubricant oil 16 through the through hole 51g, although the supply amount of the lubricant oil 16 passing through the outer peripheral surface 51d is reduced.

Next, movement of the lubricant oil 16 is explained. Explanations of movement of the lubricant oil 16 supplied to the meshing part 19 and to a low-speed-side bearing are omitted. Only an oil supply to the bearing 4 is explained by using the symbols a to d shown in FIGS. 5 and 6. (a) The lubricant oil 16 sticking between teeth of the large gear 11, is pushed out to both sides of the pinion 10 due to the meshing of the large gear 11 and the pinion 10. (b) The lubricant oil 16 pushed out from the meshing part 19, passes through the through hole 51g formed in the ring 51. A part of the lubricant oil 16, having passed through the through hole 51g, is supplied to a contact portion between the large-diameter-side end surface 6h of the inner race 6 and the large-diameter-side end surface 7b of the roller 7. (c) A part of the lubricant oil 16, pushed out from the meshing part 19, also moves to the side of the opening 4a in the bearing 4 along the outer peripheral surface 51d of the ring 51. (d) The lubricant oil 16, having moved along the outer peripheral surface 51d, is supplied from the opening 4a to the interior of the bearing 4.

Figure 7:
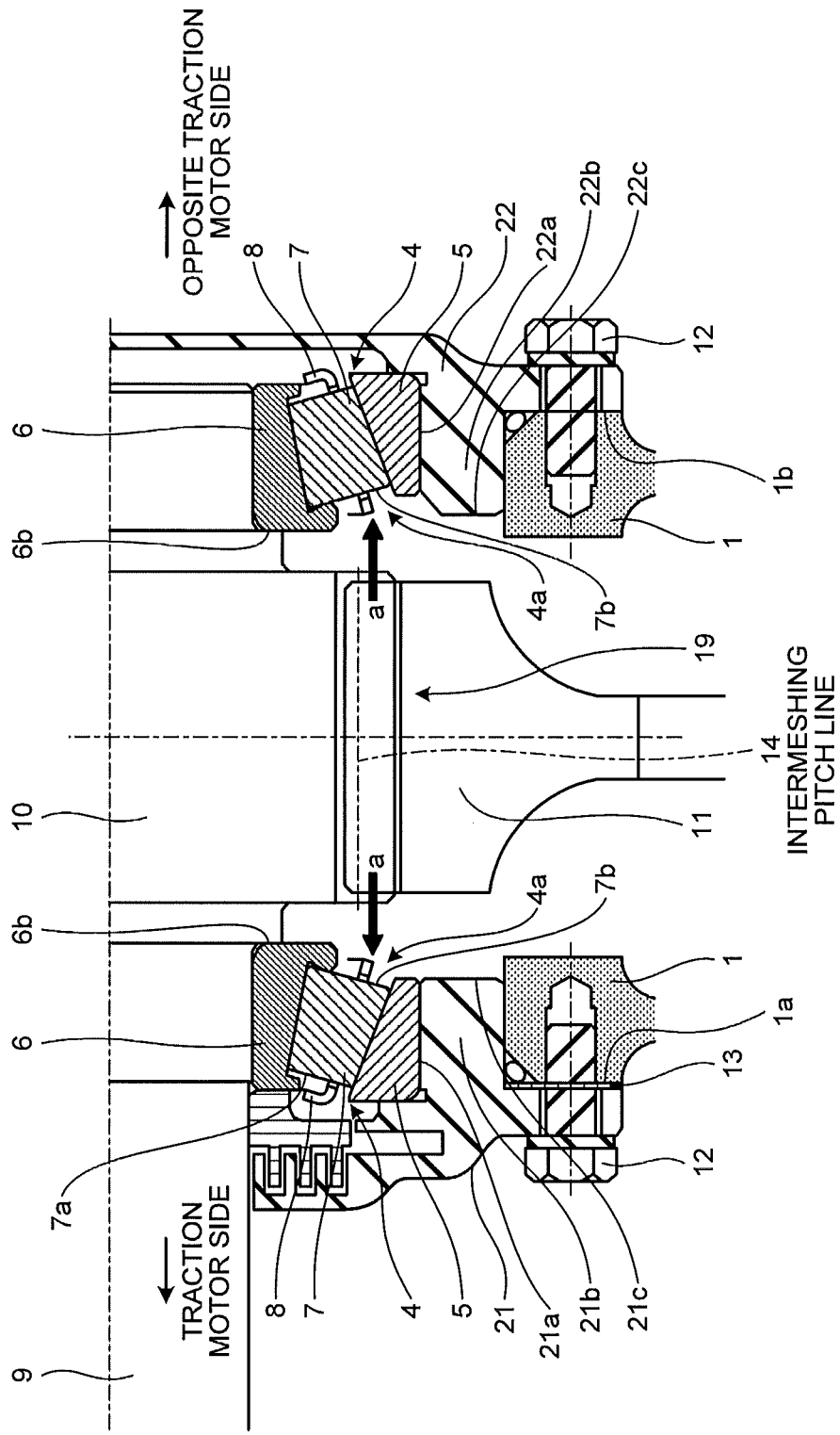
FIG. 7 is a first diagram for explaining a bearing used in a conventional gear unit and a flow of lubricant oil.
Figure 8:
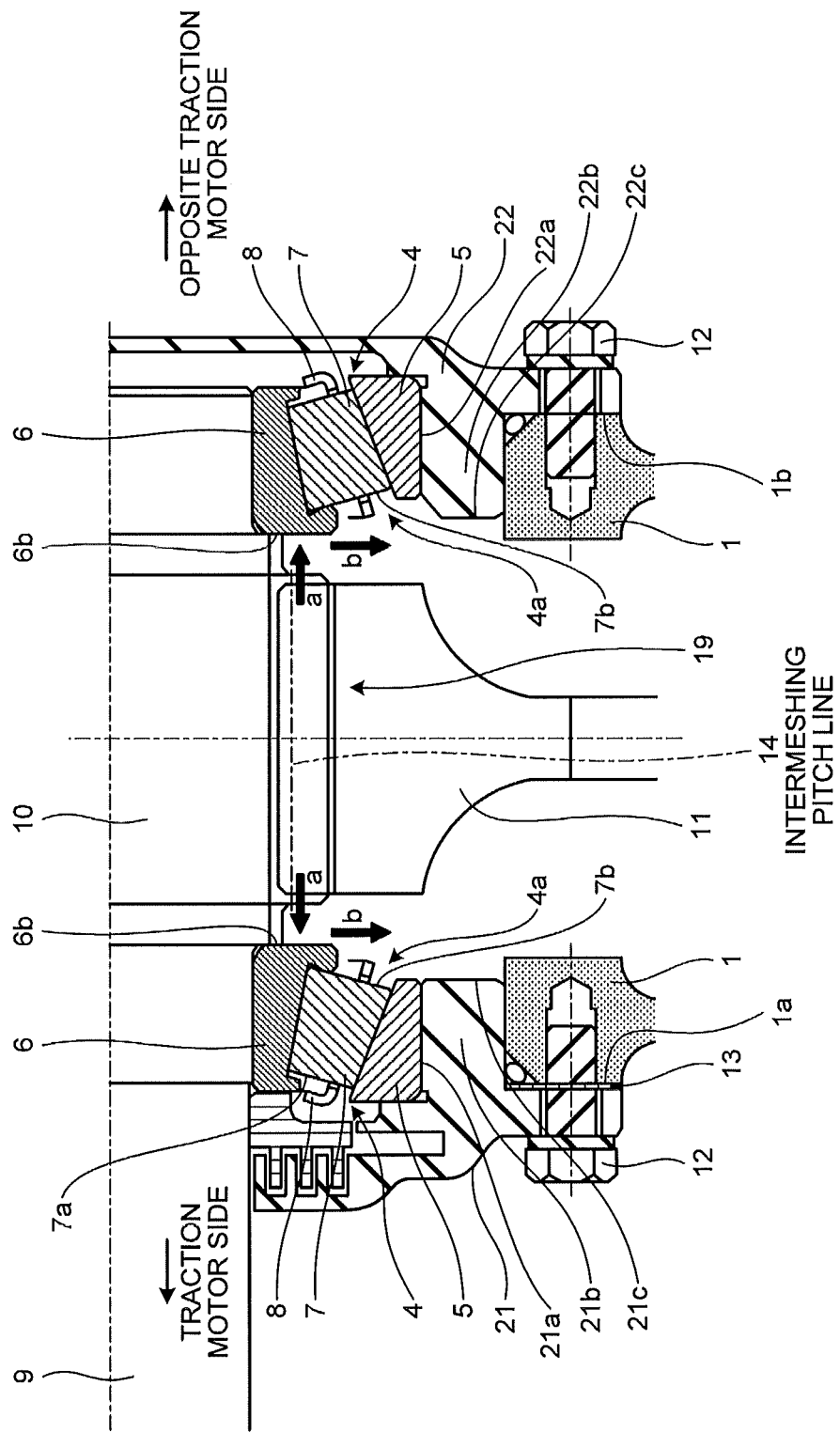
FIG. 8 is a second diagram for explaining the bearing used in the conventional gear unit and a flow of the lubricant oil.

FIG. 7 is a first diagram for explaining the bearing 4 used in a conventional gear unit and a flow of the lubricant oil 16. FIG. 8 is a second diagram for explaining the bearing 4 used in the conventional gear unit and a flow of the lubricant oil 16.

In FIG. 7, in the conventional gear unit, the opening 4a of the bearing 4 extends in the width (thickness) direction of a pinion, and is provided close to the pinion 10 with respect to an intermeshing pitch line 14. The lubricant oil 16, pushed out from the meshing part 19, is supplied from the opening 4a of the bearing 4 to the interior of the bearing 4. As described above, in the gear unit according to the conventional technique, the opening 4a of the bearing 4 is arranged generally on the lateral side of the meshing part 19.

However, depending on the setting on the module of the pinion 10 and on the setting on the number of teeth of the pinion 10, the opening 4a of the bearing 4 is not arranged on the lateral side of the meshing part 19, as shown in FIG. 8. The opening 4a of the bearing 4 shown in FIG. 8 is provided on the side of the large gear 11 with respect to the intermeshing pitch line 14. Therefore, the lubricant oil 16 pushed out from the meshing part 19, hits the gear-side end surface 6b of the inner race 6. As a result, a supply of the lubricant oil 16 into the bearing 4 becomes insufficient and overheating and seizure of the bearing 4 may be caused.

In the gear unit 100 according to the first embodiment, between the pinion 10 and the inner race 6, the ring 50 is provided in which the outer peripheral surface 50d inclined from the meshing part 19 between the large gear 11 and the pinion 10 toward the opening 4a of the bearing 4 is formed. Therefore, it is possible to pass the lubricant oil 16, pushed out from the meshing part 19 between the pinion 10 and the large gear 11, through the outer peripheral surface 50d and to supply the lubricant oil 16 to the opening 4a of the bearing 4. As a result, overheating and seizure of the bearing 4 are suppressed.

As explained above, the gear unit 100 according to the first embodiment is a reduction gear unit that accommodates, in the gear case 1, the pinion 10 that transmits a rotational force; the large gear 11 that meshes with the pinion 10, and that transmits a rotational force; and the bearing 4 that is located on each of both sides of the pinion 10 and is configured to include the inner race 6, the outer race 5, and a plurality of rollers 7. Each of the rollers 7 is configured to have a shape tapered from the large-diameter-side end surface 7b provided on the side of the pinion 10 toward the small-diameter-side end surface 7a provided on the opposite side to the side of the pinion 10. The inner race 6 includes the small-diameter-side flange portion 6d that is provided on a part of the small-diameter-side end surface 7a of the roller 7, which is opposite to the pinion 10 and extends in the direction from the inner race 6 to the outer race 5; and the large-diameter-side flange portion 6g that extends in the direction from the inner race 6 to the outer race 5 while enclosing the large-diameter-side end surface 7b of the roller 7 so as to be close to the outer race 5, thereby forming the opening 4a between the outer race 5 and the large-diameter-side flange portion 6g. The ring 50 or 51 is provided between the pinion 10 and the inner race 6. The rings 50 and 51 have an annular shape, and that are configured to respectively include the inner peripheral surfaces 50c and 51c that surround the outer peripheral surface of the pinion shaft 9 provided through the pinion 10, the gear-side end surfaces 50e and 51e that are provided on the side of the pinion 10, the bearing-side end surfaces 50b and 51b that are provided on the side of the bearing 4, and the outer peripheral surfaces 50d and 51d that are inclined from the gear-side end surfaces 50e and 51e toward the outer peripheral edges 50a and 51a of the bearing-side end surfaces 50b and 51b. When the length from the outer peripheral edge of the gear-side end surfaces 50e and 51e to the axial line 9c of the pinion shaft 9 is represented as L10, the length from the tooth root 11a of the large gear 11 to the axial line 9c is represented as L11, the length from the outer peripheral edge 6j of the gear-side end surface 6b of the large-diameter-side flange portion 6g to the axial line 9c is represented as L2, and the length from the outer peripheral edges 50a and 51a of the bearing-side end surfaces 50b and 51b to the axial line 9c is represented as L3, then the outer peripheral surfaces 50d and 51d are formed to satisfy the relationship expressed as L10<L11, and also to satisfy the relationship expressed as L3≥L2. Therefore, it is possible to pass the lubricant oil 16, pushed out from the meshing part 19 between the pinion 10 and the large gear 11, through the outer peripheral surfaces 50d and 51d and to supply the lubricant oil 16 to the opening 4a of the bearing 4 regardless of the setting on the module of a gear and the setting on the number of teeth of a pinion. As a result, overheating and seizure of the bearing 4 are suppressed.

Further, in the gear unit 100 according to the first embodiment, the through holes 51g that connect from the bearing-side end surface 10a of the pinion 10 toward the opening 4a of the bearing 4 are provided in the ring 51. Therefore, it is possible to pass the lubricant oil 16, pushed out from the meshing part 19, through the interior of the through holes 51g, and to supply the lubricant oil 16 to the opening 4a of the bearing 4. With such a configuration, it is possible to increase the supply amount of the lubricant oil 16 to the opening 4a, as the centrifugal force generated by rotations of the pinion shaft 9 is increased. As compared to the case where the through holes 51g are not provided, overheating and seizure of the bearing 4 can be further suppressed, and also it is possible to use the bearing 4 for a longer period of time.

Second Embodiment

Figure 9:
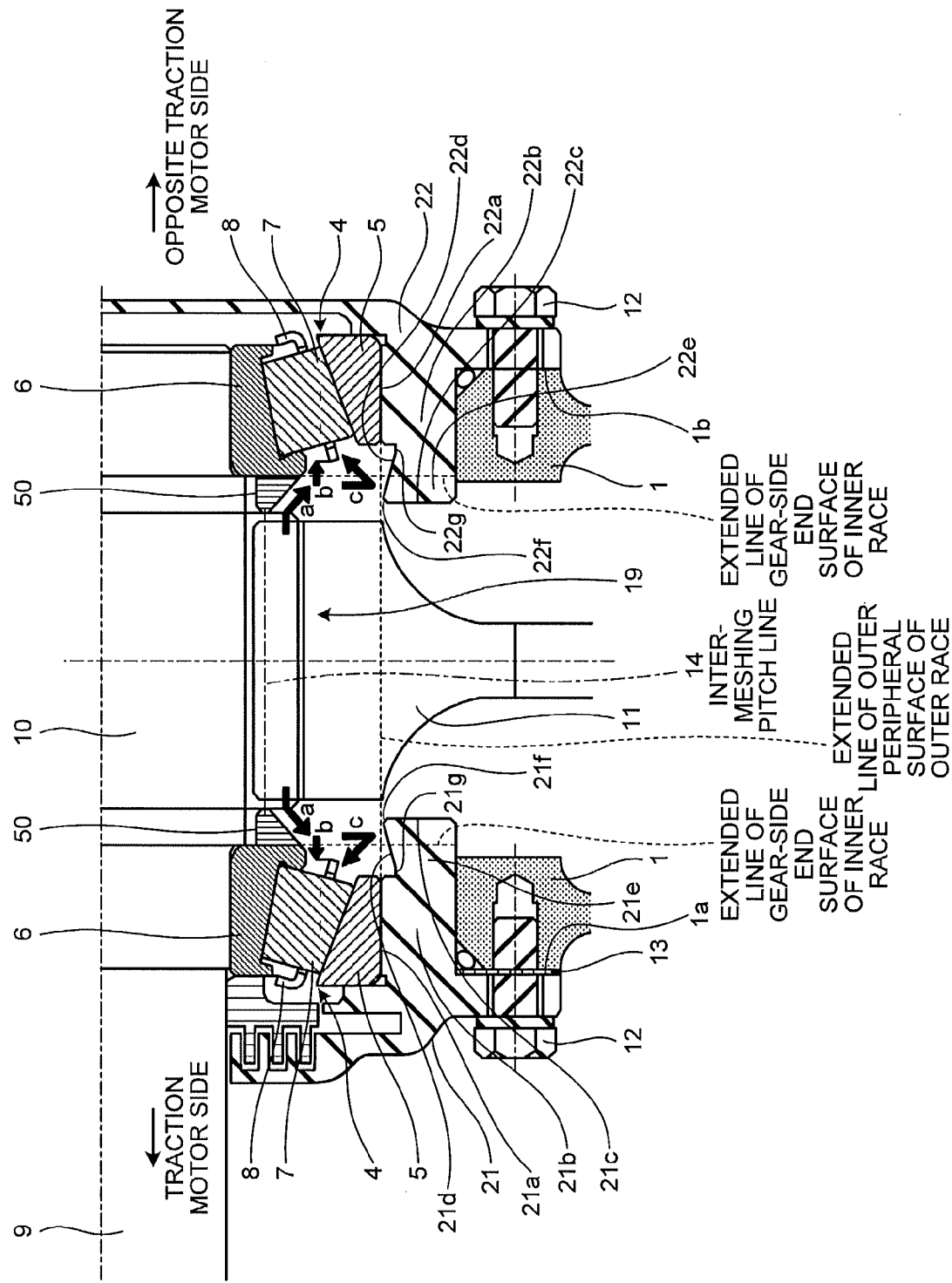
FIG. 9 depicts an internal structure of a gear unit according to a second embodiment of the present invention.

FIG. 9 depicts an internal structure of a gear unit according to a second embodiment of the present invention. Differences between the first embodiment and the second embodiment are as follows. The annular portions 21b and 22b of the pinion bearing caps 21 and 22 are respectively provided inside the gear case 1 so as to extend parallel to the pinion shaft 9, and an inner peripheral surface of each extending part of the annular portions 21b and 22b is formed into a tapered shape in which the inner diameter on the side of the bearing 4 is larger than the distal-end-side inner diameter on the tip portion side. Elements of the present embodiment that are identical to those of the first embodiment are denoted by like reference signs and explanations thereof will be omitted, and elements different from the first embodiment are explained.

The annular portion 21b of the pinion bearing cap 21, shown in FIG. 9, is provided inside the gear case 1 so as to extend in parallel to the pinion shaft 9, and includes an end portion 21e in which an end surface 21c in an extending-direction is provided on the side of the pinion 10 with respect to the extended line of the gear-side end surface 6b of the inner race 6. By forming the annular portion 21b as described above, even when a part of the lubricant oil 16 pushed out from the meshing part 19, hits a side surface (the gear-side end surface 6b) of the inner race 6, and drops toward the end portion 21e of the annular portion 21b, it is still possible to supply the lubricant oil 16 to the opening 4a of the bearing 4.

Further, the diameter of an inner peripheral edge 21g (the inner diameter on the side of the bearing 4) of a base portion of the end portion 21e (the base of the end portion 21e that is positioned on an extended line of the gear-side end surface 5d of the outer race 5) is set larger than the diameter of an inner peripheral edge 21f (the inner diameter on the tip portion side) of the end surface 21c of the end portion 21e. With such a configuration, it is possible to enhance the effect of rebounding the lubricant oil 16 dropping toward the end portion 21e of the annular portion 21b.

In FIG. 9, the diameter of the inner peripheral edge 21g is set larger than the diameter of the inner peripheral edge 21f. However, the diameter of the inner peripheral edge 21g is not limited thereto. For example, the diameter of the inner peripheral edge 21g can be set to a value equal to the diameter of the inner peripheral edge 21f. In the case of such a configuration, it is still possible to supply the lubricant oil 16 dropping toward the end portion 21e of the annular portion 21b, to the opening 4a of the bearing 4 although the effect of rebounding the lubricant oil 16 is reduced.

Similarly, the annular portion 22b of the pinion bearing cap 22 is provided inside the gear case 1 so as to extend parallel to the pinion shaft 9, and includes an end portion 22e in which an end surface 22c in an extending-direction is provided on the side of the pinion 10 with respect to the extended line of the gear-side end surface 6b of the inner race 6. Further, the diameter of an inner peripheral edge 22g of a base portion of the end portion 22e is set larger than the diameter of an inner peripheral edge 22f of the end surface 22c of the end portion 22e. With such a configuration, it is possible to enhance the effect of rebounding the lubricant oil 16.

In FIG. 9, the diameter of the inner peripheral edge 22g is set larger than the diameter of the inner peripheral edge 22f. However, the diameter of the inner peripheral edge 22g is not limited thereto. For example, the diameter of the inner peripheral edge 22g can be set to a value equal to the diameter of the inner peripheral edge 22f. In the case of such a configuration, an oil supply from the opening 4a of the bearing 4 is still possible, although the effect of rebounding the lubricant oil 16 is reduced.

Movement of the lubricant oil 16 is explained below. Movement of the lubricant oil 16 on the side of the pinion bearing cap 21 is explained here, and explanations of movement of the lubricant oil 16 on the side of the pinion bearing cap 22 are omitted. (a) The lubricant oil 16, sticking between teeth of the large gear 11, is pushed out to both sides of the pinion 10 due to the meshing of the large gear 11 and the pinion 10. (b) The lubricant oil 16 pushed out from the meshing part 19, moves along the outer peripheral surface 50d of the ring 50 to the side of the opening 4a in the bearing 4, and is supplied to the interior of the bearing 4. (c) A part of the lubricant oil 16, pushed out from the meshing part 19, drops onto the inner peripheral surface 21d of the end portion 21e of the annular portion 21b. The lubricant oil 16 having dropped to the inner peripheral surface 21d, is rebounded to the side of the bearing 4 because the end portion 21e is inclined toward the side of the bearing 4, and is then supplied from the opening 4a of the bearing 4 to the interior of the bearing 4.

As explained above, the gear unit 100 according to the second embodiment includes the pinion 10 that transmits a rotational force; the large gear 11 that meshes with the pinion 10 and transmits a rotational force; the bearing 4 according to the first embodiment, which is located on each of both sides of the pinion 10; and the pinion bearing caps 21 and 22 that are detachably fixed by the fastener 12 screwed into the surface 1a of the gear case 1 on the traction motor side and the surface 1b of the gear case 1 on the opposite side to the traction motor side, respectively, and that includes the annular portions 21b and 22b interposed between the gear case 1 and the outer peripheral surface 5b of the outer race 5, and surrounding the outer peripheral surface 5b. The annular portions 21b and 22b are provided so as to extend from outside of the gear case 1 to the inside in parallel to the pinion shaft 9 while enclosing the outer peripheral surface 5b of the outer race 5, and also includes the end portions 21e and 22e in which the end surfaces 21c and 22c in the extending-direction are provided on the side of the pinion 10 with respect to the extended line of the gear-side end surface 6b of the inner race 6. Therefore, it is possible to supply the lubricant oil 16, dropping toward the end portions 21e and 22e of the annular portions 21b and 22b, to the opening 4a of the bearing 4. As a result, it is possible to use the bearing 4 for a longer period of time.

Third Embodiment

Figure 10:
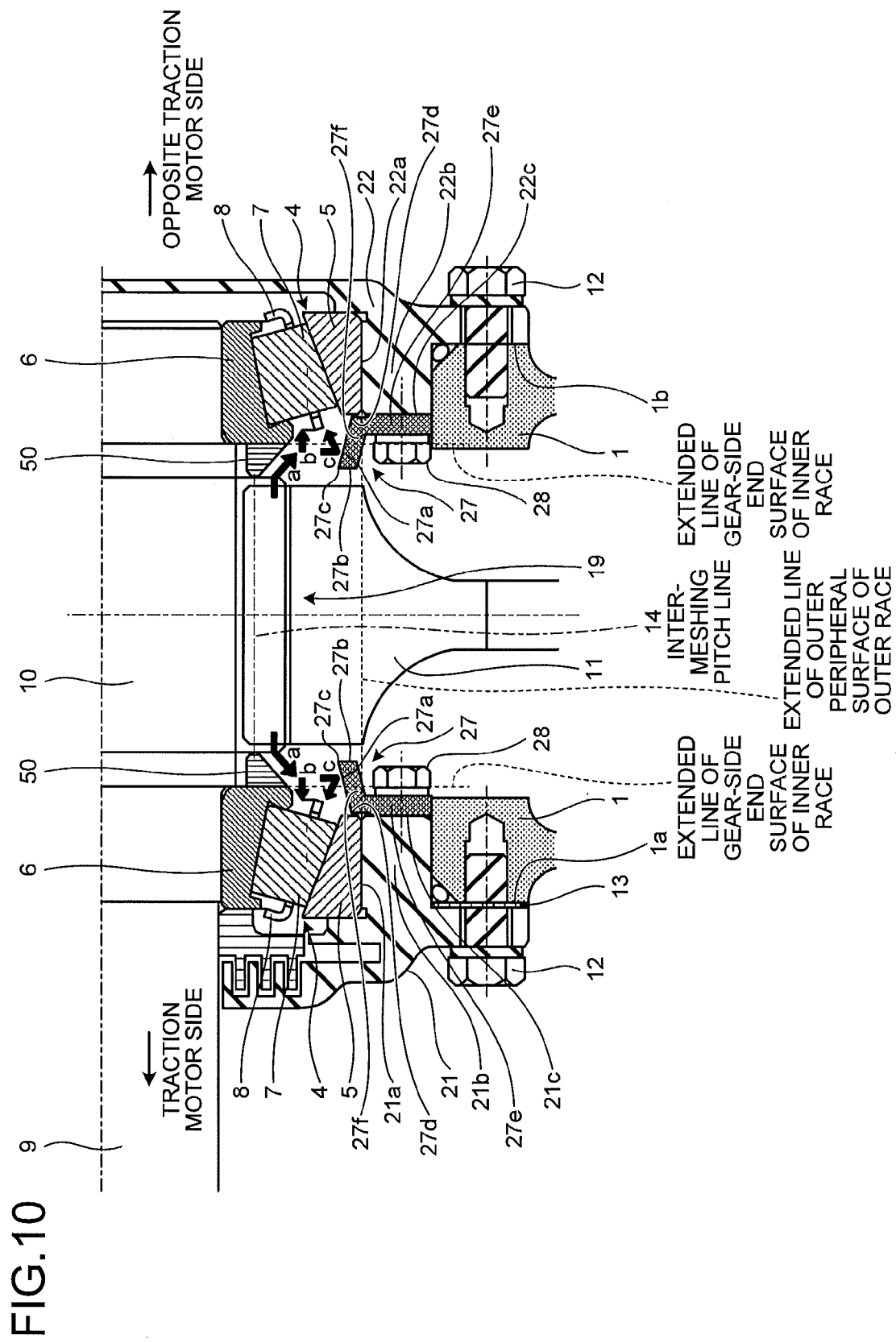
FIG. 10 depicts an internal structure of a gear unit according to a third embodiment of the present invention.

FIG. 10 depicts an internal structure of the gear unit 100 according to a third embodiment of the present invention. Differences between the first embodiment and the third embodiment are as follows. A plate 27 with a tapered inner surface is mounted on each of the end surfaces 21c and 22c of the annular portions 21b and 22b shown in FIG. 3. Elements of the present embodiment that are identical to those of the first embodiment are denoted by like reference signs and explanations thereof will be omitted, and elements different from the first embodiment are explained.

The plate 27 is provided on each of the end surfaces 21c and 22c of the annular portions 21b and 22b shown in FIG. 10. The plate 27 is constituted to include a base portion 27e that is fixed to each of the end surfaces 21c and 22c by a fastener 28 screwed from the inside into each of the end surfaces 21c and 22c, and an inclined portion 27f that extends from the base portion 27e to the inside of the gear case 1 and an end surface 27b thereof is provided on the side of the pinion 10 with respect to the extended line of the gear-side end surface 6b of the inner race 6.

Further, the diameter of an inner peripheral edge 27d of the base portion 27e is set larger than the diameter of an inner peripheral edge 27c of the end surface 27b. In FIG. 10, the inner peripheral edge 27c of the end surface 27b is provided on the side of the pinion shaft 9 with respect to an extended line of the outer peripheral surface 5b of the outer race 5. With such a configuration, it is possible to enhance the effect of rebounding the lubricant oil 16.

In FIG. 10, the diameter of the inner peripheral edge 27d is set larger than the diameter of the inner peripheral edge 27c. However, the present invention is not limited thereto. An inner peripheral surface 27a of the inclined portion 27f can be configured to be parallel to the extended line of the outer peripheral surface 5b of the outer race 5. That is, the diameter of the inner peripheral edge 27c can be set to a value equal to the diameter of the inner peripheral edge 27d. In the case of such a configuration, an oil supply from the opening 4a of the bearing 4 is still possible, although the effect of rebounding the lubricant oil 16 is reduced.

Movement of the lubricant oil 16 is explained below. (a) The lubricant oil 16, sticking between teeth of the large gear 11, is pushed out to both sides of the pinion 10 due to the meshing of the large gear 11 and the pinion 10. (b) The lubricant oil 16 pushed out from the meshing part 19, moves along the outer peripheral surface 50d of the ring 50 to the side of the opening 4a in the bearing 4 and is supplied to the interior of the bearing 4. (c) A part of the lubricant oil 16, pushed out from the meshing part 19, drops onto the inner peripheral surface 27a of the inclined portion 27f of the plate 27. The lubricant oil 16 having dropped to the inner peripheral surface 27a, is rebounded to the side of the bearing 4 because the inclined portion 27f is inclined toward the side of the bearing 4, and is then supplied from the opening 4a of the bearing 4 to the interior of the bearing 4.

The plate 27 according to the third embodiment can be configured as follows.

In order to enhance the effect of rebounding the lubricant oil 16, it is desirable that the inner peripheral surface 27a of the inclined portion 27f is inclined toward the side of the bearing 4 as much as possible. Meanwhile, the rollers 7 are fitted on the side of the pinion shaft 9. Therefore, when attachment/detachment of the pinion bearing caps 21 and 22 to/from the gear case 1 is considered, the inner peripheral edge 27c of the inclined portion 27f needs to be prevented from interfering with the outer peripheral edge 7d of the roller 7. That is, the diameter of the inner peripheral edge 27c of the inclined portion 27f needs to be larger than the outermost diameter of the roller 7 (the diameter of the area where the outer peripheral edge 7d of the large-diameter-side end surface 7b of the roller 7 comes into contact with the raceway surface 5a of the outer race 5). As described above, there is a trade-off relationship between increasing the supply amount of the lubricant oil 16 to the bearing 4 and ensuring assembling workability of the bearing 4.

Therefore, the plate 27 shown in FIG. 10 is manufactured by using shape-memory alloy or the like which changes its shape according to the temperature. Further, the plate 27 is manufactured so that the diameter of the inner peripheral edge 27c of the inclined portion 27f becomes larger at a room temperature, and becomes smaller at a temperature higher than the room temperature, than the diameter of the area where the outer peripheral edge 7d of the large-diameter-side end surface 7b of the roller 7 comes into contact with the raceway surface 5a of the outer race 5. That is, the diameter of the inner peripheral edge 27c is large enough to be capable of assembling the pinion bearing caps 21 and 22 at a low temperature. However, the diameter of the inner peripheral edge 27c is decreased under circumstances where it is necessary to supply a large amount of the lubricant oil 16 to the bearing 4.

As a result, the inner peripheral surface 27a of the inclined portion 27f is inclined at an angle not to interfere with the outer peripheral edge 7d of the roller 7 at the time of assembling work. However, when the temperature of the lubricant oil 16 is increased due to the driving of the gear, unit 100, the inner peripheral surface 27a is inclined toward the side of the opening 4a in the bearing 4 according to the increase in temperature of the lubricant oil 16. As described above, by manufacturing the plate 27 from shape-memory alloy or the like, it is possible to achieve both increasing the supply amount of the lubricant oil 16 to the bearing 4 and ensuring assembling workability of the bearing 4.

As explained above, the gear unit 100 according to the third embodiment includes the pinion 10, the large gear 11, the bearing 4, the gear case 1, and the pinion bearing caps 21 and 22 that respectively include the annular portions 21b and 22b. The plate 27 is provided on each of the end surfaces 21c and 22c of the annular portions 21b and 22b, and is constituted to include the base portion 27e that is fixed by the fastener 28 screwed from the inside into each of the end surfaces 21c and 22c, and the inclined portion 27f that extends from the base portion 27e to the inside of the gear case 1. The end surface 27b of the inclined portion 27f is provided on the side of the pinion 10 with respect to the extended line of the gear-side end surface 6b of the inner race 6. Therefore, it is possible to supply the lubricant oil 16, dropping toward the inner peripheral surface 27a of the inclined portion 27f, to the opening 4a of the bearing 4. As a result, it is possible to use the bearing 4 for a longer period of time, similarly to the second embodiment. Further, it is possible to attach/detach the plate 27 by the fastener 28. Therefore, even when a structure change is required, replacement work can be performed at a low cost.

Further, in the gear unit 100 according to the third embodiment, the plate 27 is manufactured from shape-memory alloy. Furthermore, the diameter of the inner peripheral edge 27c of the inclined portion 27f becomes larger at a room temperature, and becomes smaller at a temperature higher than the room temperature, than the diameter of the area where the outer peripheral edge 7d of the large-diameter-side end surface 7b of the roller 7 comes into contact with the raceway surface 5a of the outer race 5. Therefore, it is possible to increase the supply amount of the lubricant oil 16 to the bearing 4, while ensuring assembling workability of the bearing 4.

In the first to third embodiments, an example in which the bearing 4, the pinion bearing caps 21 and 22, and the plate 27 are applied to a gear unit for driving a railway vehicle has been explained. However, the bearing 4, the pinion bearing caps 21 and 22, and the plate 27 are also applicable to a reduction gear mechanism incorporated in a vehicle such as an automobile or an aircraft, and to a reduction gear mechanism incorporated in a general industrial device.

INDUSTRIAL APPLICABILITY

As described above, the present invention is mainly applicable to a gear unit, and is particularly useful as an invention that can stably supply lubricant oil to the interior of a bearing, regardless of the setting on a module of a gear and the setting on the number of teeth of a pinion.

The invention claimed is:

1. A reduction gear unit that accommodates, in a gear case, a pinion that transmits a rotational force, a large gear that meshes with the pinion and transmits a rotational force, and a bearing that is located on each of both sides of the pinion and is configured to include an inner race, an outer race, and a plurality of rollers, wherein each of the rollers is configured to have a shape tapered from a large-diameter-side end surface provided on a side of the pinion toward a small-diameter-side end surface provided on an opposite side to the side of the pinion, the inner race includes a small-diameter-side flange portion that is provided on a part of the small-diameter-side end surface of the roller, which is opposite to the pinion, and extends in a direction from the inner race to the outer race, and a large-diameter-side flange portion that extends in a direction from the inner race to the outer race while enclosing the large-diameter-side end surface of the roller, so as to be close to the outer race and forms an opening between the outer race and the large-diameter-side flange portion, a ring that has an annular shape, and that is configured to include an inner peripheral surface that surrounds an outer peripheral surface of a pinion shaft provided through the pinion, a gear-side end surface that is provided on the side of the pinion, a bearing-side end surface that is provided on a side of the bearing, and an outer peripheral surface that is inclined from the gear-side end surface toward an outer peripheral edge of the bearing-side end surface, is provided between the pinion and the inner race, and when a length from an outer peripheral edge of the gear-side end surface to an axial line of the pinion shaft is represented as L10, a length from a tooth root of the large gear to the axial line is represented as L11, a length from an outer peripheral edge of a gear-side end surface of the large-diameter-side flange portion to the axial line is represented as L2, and a length from an outer peripheral edge of the bearing-side end surface to the axial line is represented as L3, the outer peripheral surface of the ring has a shape satisfying a relationship expressed as L10<L11, and also satisfying a relationship expressed as L3≥L2.

2. The reduction gear unit according to claim 1, wherein a plurality of through holes that are formed with a predetermined spacing therebetween in a rotation direction, and that connect from a bearing-side end surface of the pinion toward the opening are provided in the ring.

3. The reduction gear unit according to claim 2, wherein when a length from a gear side opening of the through hole to the axial line is represented as L12, and a length from a bearing side opening of the through hole to the axial line is represented as L4, the through hole has a shape satisfying a relationship expressed as L12<L4.

4. The reduction gear unit according to claim 2, wherein when a length from an inner peripheral edge of a gear-side end surface of the outer race to the axial line is represented as L1, the ring has a shape satisfying a relationship expressed as L1≥L3≥L2≥L11>L10.

5. The reduction gear unit according to claim 1, further comprising pinion bearing caps each of which is detachably fixed by a fastener screwed into a side surface of the gear case, and includes an annular portion interposed between the gear case and an outer peripheral surface of the outer race of the bearing and surrounding the outer peripheral surface, wherein
   each annular portion of each pinion bearing cap extends from outside of the gear case toward inside thereof and parallel to the pinion shaft while enclosing the outer peripheral surface of the outer race, and includes an end portion in which an end surface in an extending-direction is provided on the side of the pinion with respect to an extended line of a gear-side end surface of an inner race of the bearing.

6. The reduction gear unit according to claim 5, wherein a diameter of an inner peripheral edge of a base portion of the end portion is larger than a diameter of an inner peripheral edge of the end surface of the end portion.

7. The reduction gear unit according to claim 5, wherein a diameter of an inner peripheral edge of a base portion of the end portion is equal to a diameter of an inner peripheral edge of the end surface of the end portion.

8. The reduction gear unit according to claim 1, further comprising pinion bearing caps each of which is detachably fixed by a fastener screwed into a side surface of the gear case, and includes an annular portion interposed between the gear case and an outer peripheral surface of the outer race of the bearing and surrounding the outer peripheral surface, wherein
   on an end surface of the annular portion of each pinion bearing cap, a plate that is configured to include a base portion that is fixed by a fastener screwed from inside into the end surface, and an inclined portion that extends from the base portion to inside of the gear case and includes an end surface on the side of the pinion with respect to an extended line of a gear-side end surface of an inner race of the bearing, is provided.

9. The reduction gear unit according to claim 8, wherein a diameter of an inner peripheral edge of the base portion is larger than a diameter of an inner peripheral edge of the end surface.

10. The reduction gear unit according to claim 8, wherein a diameter of an inner peripheral edge of the base portion is equal to a diameter of an inner peripheral edge of the end surface.

11. The reduction gear unit according to claim 8, wherein the plate is manufactured from shape-memory alloy, and
   a diameter of an inner peripheral edge of the inclined portion becomes larger at a room temperature, and becomes smaller at a temperature higher than the room temperature, than a diameter of an area where an outer peripheral edge of a large-diameter-side end surface of a roller of the bearing comes into contact with the raceway surface of the outer race.

\* \* \* \* \*